United States Patent
Dorsch

(10) Patent No.: US 11,873,459 B2
(45) Date of Patent: Jan. 16, 2024

(54) METHOD OF WET COAL PROCESSING FOR ELECTRICAL POWER GENERATION BASED UPON MOISTURE MEASUREMENTS

(71) Applicant: Martlin Distributing, LLC, Baden, PA (US)

(72) Inventor: Michael Gerard Dorsch, Baden, PA (US)

(73) Assignee: MARTLIN DISTRIBUTING, LLC, Carnegie, PA (US)

( * ) Notice: Subject to any disclaimer, the term of this patent is extended or adjusted under 35 U.S.C. 154(b) by 0 days.

(21) Appl. No.: 17/234,526

(22) Filed: Apr. 19, 2021

(65) Prior Publication Data

US 2021/0324284 A1 Oct. 21, 2021

Related U.S. Application Data

(60) Provisional application No. 63/012,184, filed on Apr. 19, 2020.

(51) Int. Cl.
| | |
|---|---|
| *C10L 5/04* | (2006.01) |
| *C10L 10/00* | (2006.01) |
| *C10L 5/26* | (2006.01) |
| *G01N 22/04* | (2006.01) |

(52) U.S. Cl.
CPC ........ *C10L 5/04* (2013.01); *C10L 5/26* (2013.01); *C10L 10/00* (2013.01); *G01N 22/04* (2013.01); *C10L 2230/14* (2013.01); *C10L 2250/04* (2013.01); *C10L 2290/08* (2013.01); *C10L 2290/24* (2013.01); *C10L 2290/28* (2013.01); *C10L 2290/60* (2013.01)

(58) Field of Classification Search
CPC .. C10L 10/00; C10L 2230/14; C10L 2250/04; C10L 2290/08; C10L 2290/24; C10L 2290/28; C10L 2290/60; C10L 5/04; C10L 5/26; G01N 22/04
See application file for complete search history.

(56) References Cited

U.S. PATENT DOCUMENTS

| | | | |
|---|---|---|---|
| 5,384,343 A | 1/1995 | Farrar et al. | |
| 8,117,975 B2 | 2/2012 | Allen et al. | |
| 2010/0024693 A1* | 2/2010 | Allen | F23J 15/003 |
| | | | 110/185 |

FOREIGN PATENT DOCUMENTS

CN 103375808 A * 10/2013

* cited by examiner

*Primary Examiner* — Latosha Hines
(74) *Attorney, Agent, or Firm* — Blynn L. Shideler; Krisanne Shideler; BLK Law Group

(57) ABSTRACT

A method of wet coal processing for electrical power generation comprises the providing a stream of a wet coal mix for an electrical power generation system having a boiler, such as metering coal product onto a conveyor; measuring the amount of moisture of the wet coal mix in the stream, such as with a moisture sensor on the conveyor; determining an amount of drying material to be added to the wet coal mix; adding the determined amount of drying material, such as one or more super absorbent polymers, added to the wet coal mix; Milling the treated wet coal mix; Transporting the milled treated wet coal mix to the boiler of the electrical power generation system for combustion. The method may utilize treated coal wash residual product and teaches a process for treating coal wash residual product.

12 Claims, 2 Drawing Sheets

METHOD OF WET COAL PROCESSING FOR ELECTRICAL POWER GENERATION BASED UPON MOISTURE MEASUREMENTS

RELATED APPLICATIONS

This application claims the benefit of U.S. provisional patent application Ser. No. 63/012,184 filed Jul. 19, 2020, titled "Method of Wet Coal Processing for Electrical Power Generation Based upon Moisture Measurements" which is incorporated herein by reference.

BACKGROUND OF THE INVENTION

1. Field of the Invention

This invention generally relates to method of wet coal processing for electrical power generation based upon moisture measurements.

2. Background Information

Modern life is unimaginable without electricity. It lights houses, buildings, streets, provides domestic and industrial heat, and powers most equipment used in homes, offices and machinery in factories. Improving access to electricity worldwide is critical to alleviating poverty.

Coal plays a vital role in electricity generation worldwide. Coal-fueled power plants currently fuel about 38% of global electricity and, in some countries, coal fuels a higher percentage of electricity. In the United State the electrical output from coal powered electrical generation has dropped since 2008 to 966,000 gigawatthours (GWh) in 2019, this still represents a considerable amount. In fact, this is slightly more than the entire Canadian electrical output in 2019 and also all other countries other than China, The US, India, Russia and Japan in 2019.

FIG. 1 is a schematic view of a conventional coal powered electrical generation system, known as a pulverized coal combustion (PCC) system 10. The coal used in such electrical power generation is sometimes referred to as steam coal, and also known as thermal coal. In a PCC system 10 the coal is milled or pulverized to a fine powder, which increases the surface area of the fuel and allows it to burn more quickly. Specifically, the coal is provided from one or more supplies 12 and fed on a conveyor 14 to a pulverizing unit or mill 16. The coal is then stored in bunkers, which are not shown in this schematic, and may be fed through a second mill prior to the systems 10. In these pulverized coal combustion (PCC) systems 10, the powdered coal is eventually blown into the combustion chamber of a boiler 20 where it is burned at high temperature. The hot gases and heat energy produced converts water, contained within tubes lining the boiler 20, into steam. The high-pressure steam is passed into a turbine 28 containing thousands of propeller-like blades. The steam pushes blades of the turbine 28 causing the turbine shaft to rotate at high speed. A generator 30 is mounted at one end of the shaft of the turbine 28 and consists of carefully wound wire coils. Electricity is generated by the generator 30 when these are rapidly rotated in a strong magnetic field. After passing through the turbine 28, the steam is condensed in a condenser 26 and returned to the boiler 20 to be heated once again. The electricity generated is transformed through a transformer 32 into the higher voltages (up to 400,000 volts) used for economic, efficient transmission via power line grids 34. When it nears the point of consumption, such as individual homes, the electricity is transformed down to the safer voltages used in the domestic market. Water purification units 24 and ash disposal systems 36 also make up conventional PPC systems 10.

Coal normally contains both inherent and surface moisture, together referred to as total moisture. When coal becomes too wet, the transportation and processing of the coal poses problems for the PCC system 10 as it may block transfer chutes, it may also cause "hang-ups" in bunkers prior to feeding the boiler or furnace 20, hindering the free flow of coal. Wet coal can also result in the clogging of milling plants and associated pipework. When the coal is removed from the mills through a blast of hot air, if the coal is too wet, the drying out is ineffective and has a negative effect on the combustion of coal. In other words, if the total moisture content becomes too high, the amount of heat energy required to evaporate the moisture is greater than the boiler design allows. This limits the amount of coal that can be dried for the milling process and the amount of pulverized coal that can be fired into the boiler, in turn limiting the amount of electricity that can be generated.

Excessive total moisture of coal typically results from excessive rain and uncontrollably high surface water content in the raw coal. Coal from the mines, whether open cast or underground mining, is stored on stockpiles forming supplies 12 from where it is reclaimed for power station use.

It is known to absorb aqueous fluids in general utilizing water absorbent particulate polymeric material, particularly a super absorbent polymer (SAP). SAP's (also called slush powder) can absorb and retain extremely large amounts of a liquid relative to its own mass. Water-absorbing polymers, which are classified as hydrogels when mixed, absorb aqueous solutions through hydrogen bonding with water molecules. A SAP's ability to absorb water depends on the ionic concentration of the aqueous solution. In deionized and distilled water, an SAP may absorb 300 times its weight (from 30 to 60 times its own volume). The total absorbency and swelling capacity are controlled by the type and degree of cross-linkers used to make the gel. Low-density cross-linked SAPs generally have a higher absorbent capacity and swell to a larger degree. These types of SAPs also have a softer and stickier gel formation. High cross-link density polymers exhibit lower absorbent capacity and swell, but the gel strength is firmer and can maintain particle shape even under modest pressure.

The largest use of SAPs is found in personal disposable hygiene products, such as diapers and sanitary napkins. SAP was discontinued from use in tampons due to a 1980's concern over a link with toxic shock syndrome. SAP is also used for blocking water penetration in underground power or communications cable, in self-healing concrete, horticultural water retention agents, control of spill and waste aqueous fluid, and artificial snow for motion picture and stage production. The first commercial use was in 1978 for use in feminine napkins in Japan and disposable bed liners for nursing home patients in the USA.

Relevant to coal power plants, U.S. Pat. No. 5,384,343 discloses a wet, particulate, sticky mass which is converted to a crumbly, or flowable, solid by mixing into the mass water absorbent synthetic polymer particles that are substantially non-sticky when swollen with water and that are non-film forming, and in this process the particles have an effective dry size within the mass of at least 90% by weight below 50 microns and the particles are mixed into the mass while the particles are in the form either of internally bonded friable aggregates having a dry size of at least 90% by weight above 50 microns or in the form of a dispersion in water immiscible liquid of particles having a dry size of at least 90% by weight below 50 microns. The invention of U.S. Pat. No. 5,384,343 is noted to be of particular value when the sticky mass is a coal fines filter cake, for instance the sticky mass that results from vacuum filtration by a disc, drum or other vacuum filter of a slurry or froth flotation concentrate of coal fines, typically having a particle size below 0.5 mm. Often the particle size is mainly in range 50 to 300 microns, often at least 80% by weight below 100 microns. The ash content of the cake is usually below 30% often below 15%. The cake can be taken direct from the filter or it can be stored for prolonged periods, e.g., as a wet coal fine dump, before treatment in the invention of U.S. Pat. No. 5,384,343. The resultant mass is crumbly, as opposed to the sticky and pasty texture before treatment, and can easily be mixed with coal smalls to form a useful fuel, or used in some other way. Whereas 10% coal fines is often the maximum that can be incorporated by traditional techniques, in the invention the amount of coal fines can be increased considerably, e.g., to 20% or more. Typically, the crumbly dry coal fines are used as an industrial fuel, e.g., in an electricity generating station. They are often subjected to various treatments such as blending, pelleting, and/or grinding before being burnt. The coal fines filter cake or other wet particulate mass discussed in U.S. Pat. No. 5,384,343 is described has having a water content in the range 15 to 50%, often 20 to 40% and usually around 25 to 35%.

Further relevant to fossil fuel fired power plants, or more specifically to pulverized coal combustion (PCC) systems 10, U.S. Pat. No. 8,117,975 discloses an emissions-control-agent dispenser, a furnace, an emissions monitor and, optionally, a controller, is disclosed. The emissions-control-agent dispenser provides a prescribed amount of organic-emissions-control agent, such as, for example, an opacity-control agent to the fossil-fuel-fired system. The '975 patent states that the inventors "unexpectedly found that a superabsorbent polymer acts as an emissions control agent 18 in general and, in particular, as an opacity control agent. In such case, the emissions-control-agent dispenser 12 is a superabsorbent-polymer dispenser having the capability of dispensing a superabsorbent polymer having an average particle size of at least about 200 microns and even of at least about 250 microns." The furnace includes an exhaust communicating with the atmosphere. The emissions monitor is capable of measuring at least one property of the flue-gas communicated through the exhaust to the atmosphere. For example, when an organic-emissions-control agent is an opacity-control agent, the emissions monitor has the capability of at least measuring opacity. When included, the controller communicates with at least the emissions-control-agent dispenser and the emissions monitor.

SAPs thus have been proposed for use in PCC systems for coal treatment and processing for various reasons, but have not been effectively implemented. SAP products are relatively expensive and their extensive or high-volume use is cost prohibitive in PCC systems. The prior art does not really provide effective systems or methods for implementing the efficient use of SAP for coal treatment. This lack of practicality can be evidenced by a closer look at the range of possible SAP use disclosed in the alleged prior art systems, and it is noted that the '975 patent discloses a use of SAP as an emissions-control-agent in the range of "about 0.02 pounds/ton of fuel to about 100 pounds/ton." This is a proposed range of "about" 500,000% in SAP use variation, which is highly impractical and meaningless range in practice.

There remains a need in the art for methods and systems for efficiently implementing SAP into coal processing in PPCC Systems.

SUMMARY OF THE INVENTION

The various embodiments and examples of the present invention as presented herein are understood to be illustrative of the present invention and not restrictive thereof and are non-limiting with respect to the scope of the invention.

One aspect of the present invention provides a method of wet coal processing for electrical power generation comprising the steps of: providing a stream of a wet coal mix for an electrical power generation system having a boiler; measuring the amount of moisture of the wet coal mix in the stream of wet coal mix; determining an amount of drying material to be added to the wet coal mix in the stream of wet coal mix; adding the determined amount of drying material added to the wet coal mix in the stream of wet coal mix; milling the combination of drying material added to the wet coal mix and the wet coal mix; and transporting the milled combination of drying material added to the wet coal mix and the wet coal mix to the boiler of the electrical power generation system for combustion.

The method according to one aspect of the invention may provide wherein the drying material is one or a combination of superabsorbent polymers, specifically sodium poly-acrylate.

The method according to one aspect of the invention provides a step of providing a stream of a wet coal mix, which includes metering coal onto a conveyor and wherein the step of measuring the amount of moisture of the wet coal mix in the stream of wet coal mix includes the use of a moisture sensor on the conveyor. The method of the invention may be automated wherein the moisture sensor on the conveyor is coupled to a controller. Further, the method according to one aspect of the invention may provide wherein the step of measuring the amount of moisture of the wet coal mix in the stream of wet coal mix includes a feedback measurement of moisture using a moisture sensor measuring moisture after the addition of the drying agent. The method according to invention may provide wherein the step of providing a stream of a wet coal mix coal includes inclusion of a treated coal wash residual product treated by the prior addition of one or more super absorbent polymers.

Another aspect of the present invention provides a method of coal wash residual product processing comprising the steps of: providing a stream of a coal wash residual product; measuring the amount of moisture of the coal wash residual product in the stream of coal wash residual product; Determining an amount of drying material to be added to the coal wash residual product in the stream of coal wash residual product; Adding the determined amount of drying material added to the coal wash residual product in the stream of coal wash residual product; Milling the combination of drying material added to the coal wash residual product and the coal wash residual product.

These and other advantages of the present invention are described below in connection with the attached figures in which like reference numerals represent like elements throughout.

DESCRIPTION OF THE PREFERRED EMBODIMENTS

Figure 2:
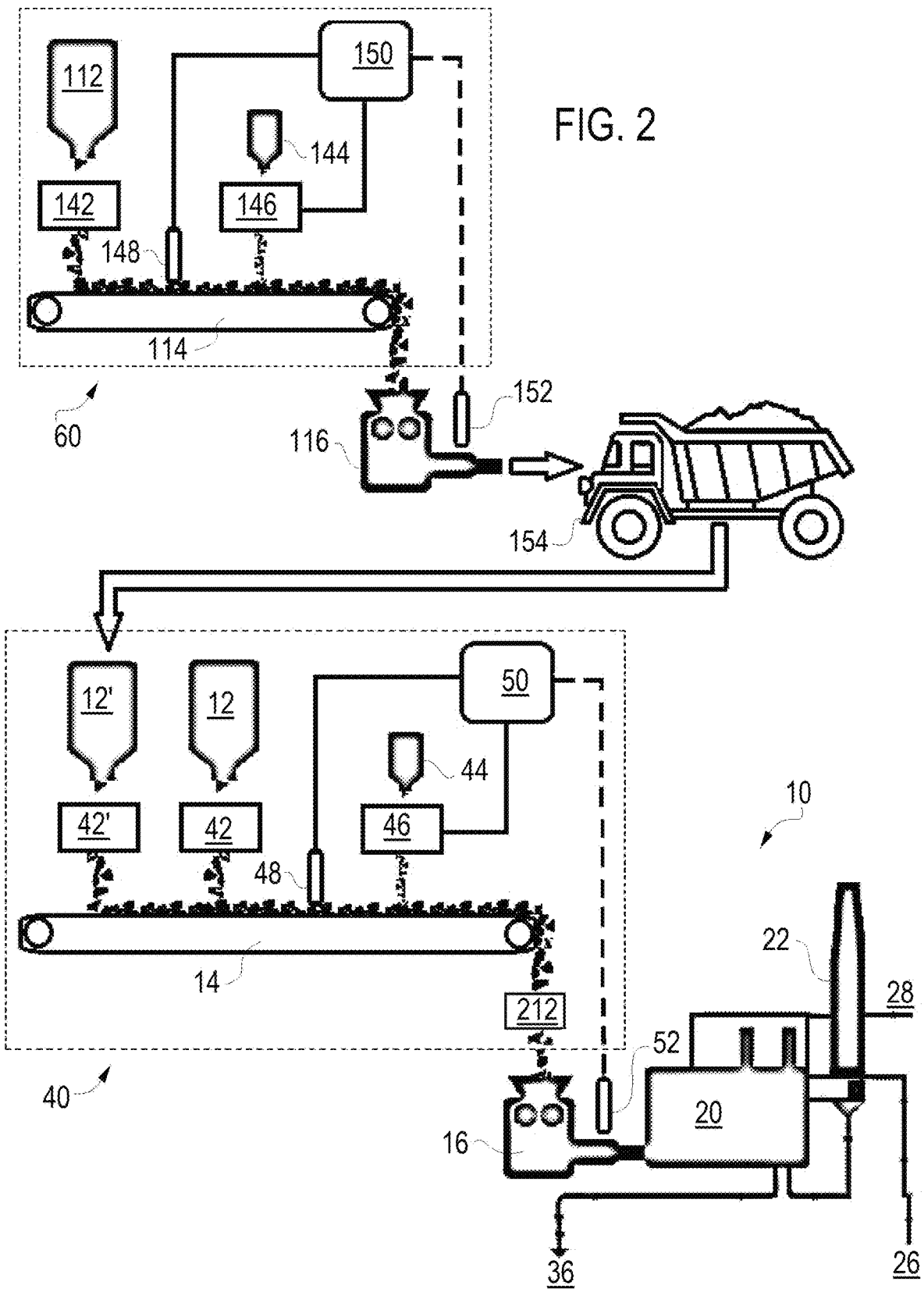
FIG. 2 is a schematic view of method of wet coal processing for electrical power generation based upon moisture measurements in accordance with the present invention.

FIG. 2 is a schematic view of method of wet coal processing for electrical power generation at a PCC system 10 based upon moisture measurements in accordance with the present invention.

The wet coal is provided from one or more supplies 12 (and possibly 12' discussed below) and fed by distributing feeders 42 (or 42') onto a conveyor 14 to be directed to a pulverizing unit or mill 16. The coal at this stage is referenced herein as a "wet coal mix" as it may include what is conventionally known as "wet coal" from supplies 12 and may further include portions of treated coal washing product, discussed below, from supply 12'.

The metering of the wet coal mix by feeders 42 and 42' provides a stream of wet coal mix having a relatively consistent flow rate (tons/hour) allowing for efficient treatment in the method of the present invention. The rate of wet coal mix supplied by the feeders 42 (and/or 42') and the speed of the conveyor 14 combine to define a consistent and known mass flow rate of the stream of the wet coal mix, typically measured in tons/hour. The feeders 42 and 42' may take many forms, including gravity feeders, screw conveyors and any material transport device that allows the measured control of material.

In a fully automated system 10, the feeders 42 and 42' and the conveyor 14 are coupled to a controller 50, which will calculate the wet coal mix stream's mass feed rate for the system 10. Alternatively, the operational parameters of the feeders 42 and 42' and the belt 14 can be inputted into the controller 50 for the calculation of the wet coal mix mass feed rate.

A key component of the present invention is measuring the moisture content of the wet coal mix to precisely know the moisture content of the stream. The system 10 according to the present invention incorporates a sensor 48 that can measure the moisture of the wet coal mix. One advantageous method is to use a sensor 48 on the conveyor 14 that is coupled to the controller 50.

The sensor 48 may be, for example, a microwave-based moisture sensor wherein microwave transmission measures the moisture in coal, in real time, on a conveyor 14. In this implementation a microwave transmitter is mounted underneath the conveyor 14 and a microwave receiver is mounted above the wet coal mix on the conveyor 14. By measuring variation in the absorption of the microwave signal, the moisture content in the wet coal mix is determined. Other types of moisture sensors may be utilized. The sensor 48 may calculate the moisture content of the wet coal mix or may transmit the signals to the controller 50 that could make this calculation. The accuracy of the sensor 48 is be expected to be +/−0.05% and is more than sufficient for the present invention. See MOISTTECH CORP, and REALTIME INSTRUMENTS for suitable commercially available moisture sensors 48.

It is possible the sensor 48 within implementing the method of the present invention, is a manually operated sensor that an operator periodically places into the wet coal mix on the conveyor 14, such as once an hour or several times per shift. However, automating the process with sensors mounted in the stream and coupled to the controller 50 eliminates this manual aspect.

The present invention uses the measured moisture content of the wet coal mix to control the distribution of a preferred drying agent, namely an SAP, from supply or hopper 44 through a feeder 46. The feeder 46 may take many forms, including gravity feeders, screw conveyors and any material transport device that allows the precise measured control of drying material from the hopper 44. The drying material is added to the wet coal mix prior to the pulverizing mill 16. This placement allows the wet coal mix to be initially treated prior to the entry into the mill 16 to avoid detrimental effects of excess moisture in the mill, further the processing of the wet coal mix in the mill 16 assures that the drying material is thoroughly mixed throughout the processed wet coal mix prior to entry into the boiler 20.

The present invention contemplates that the treated coal may be sent to closed bunkers 212 after treatment. In some applications the bunkers are optional and may be eliminated. Further, the bunkers 212 may be before the mill 16 as shown, or may be after the mill 16 but before the furnace. Where the bunkers 212 are placed after the mill 16, a second mill/mixer may be added between the bunkers 212 and the boiler 20 to further process the coal mix before combustion, but where such a second mill is utilized the pulverizing/mixing requirements of this second mill will be significantly reduced in the processed coal. There is an advantage to having the treated wet coal flow through the mill 16 close to the treatment time as discussed further below. The use and positioning of the storage bunkers 212 does not alter the key operational aspects of the method of the present invention.

The drying material is preferably one of, or a combination of, superabsorbent polymers (SAPs). SAPs are materials that have the ability to absorb and retain large volumes of water and aqueous solutions which makes them ideal for use in this water absorbing application. SAPs are divided into two main classes; i.e., synthetic (petrochemical-based) and natural (e.g., polysaccharide- and polypeptide-based). Some SAP may be made from chemically modified starch and cellulose and other polymers like poly(vinyl alcohol) PVA, poly (ethylene oxide) PEO all of which are hydrophilic and have a high affinity for water. When lightly cross-linked, chemically or physically, these polymers became water-swellable but not water-soluble. A preferred SAP, sodium poly-acrylate, may be made from partially neutralized, lightly cross-linked poly(acrylic acid), which has been proven to give the best performance versus cost ratio. Sodium poly-acrylate is manufactured at low solids levels for both quality and economic reasons, and is dried and milled in to granular white solid.

In selecting an SAP for the present invention, it is important to note that historically it is known that SAPs with no surface treatment and low internal cross-linking tend to show high swelling capacities but poor absorption against pressure. Improving the swelling capacity of SAP by decreasing the core cross-linking, i.e. decreasing the cross-linking density, is limited by the accompanying increase in extractable polymer content of the gel. Likewise, the increase in capacity would lead to a decrease in the uptake of liquid when the SAP was under load, for example a baby sitting on its diaper in a common application of SAP. Moreover, the pressure on the semi-swollen gel in such application can cause a blockage in the area preventing further liquid entering the gel bed and being absorbed by dry SAP underneath. This means that when a pressure is applied on the SAP, liquid is not absorbed effectively in these areas, however this pressure limitation is not a practical limitation in the present invention. Thus, SAP choices are not limited by absorption under load considerations in the method of the present invention.

One of the key aspects to the present invention is the location of the introduction of the drying material, namely the SAP. Introducing the dry powder SAP directly on the wet coal mix on the conveyor 14 prior to the mill 16 is believed to be advantageous. Adding the SAP further upstream in the supply 12 or coal bins can utilize a greater than needed amount of SAP and introducing the SAP in the mill 16 does not allow the SAP time to operate prior to the mill operation and can undesirably hinder the mill operation.

Another key aspect of the invention is the metered application of the SAP drying material to the wet coal mix on the conveyor 14 based upon the measured moisture content of the wet coal mix. The precise amount of SAP drying material added will depend upon the type of coal and the measured moisture content, but it is expected that 0.3-2.0 LBS of SAP drying material/ton of wet coal mix will be added, more preferably 0.5 to 1.5 LBS of SAP drying material/ton of wet coal mix. These amounts would correspond to a moisture content range of 8% to 16% of the wet coal mix.

As noted, the precise amount of SAP drying material added will depend upon the type of coal and the measured moisture content, but general operational parameters are believed necessary for the evaluation and implementation of the method of the present invention. Thus, it is expected that there will be a high threshold (e.g., 2.0 LBS) of SAP drying material/ton of wet coal mix to be added in the present invention and a lower threshold (e.g., 0.3 LBS) that is at least 0.15% of the high threshold. More preferably there is a lower threshold that is at least ⅓ (e.g., 0.5 LBS) of the high threshold (e.g., 1.5 LBS). Having both a relatively low amount (e.g., less than 2 LBS) for a high threshold and a relatively tight range of operational amounts allows the method of the present invention to be accurately evaluated for cost effectiveness. The ability to accurately forecast the SAP usage of the present invention is significant to allow for the adoption of the technology.

Although a precise linear relationship between the measured moisture content and the SAP material added could be used, preferably the method of the present invention implements steps of operation at some thresholds of measured moisture. The following is a five-step implementation. For example, below a minimum moisture measurement value no SAP is needed—i.e., the wet coal mix is not "wet", and above a high threshold the SAP additive is not cost effective and other drying steps may be implemented on the coal before using the present invention. Further in-between the high and low threshold there may be a step function to the control of the feeder 46, such as a low flow rate of SAP for a range of measured moistures, a medium for a higher range of measured moisture and a high range for the highest range of measured moistures.

Figure 1:
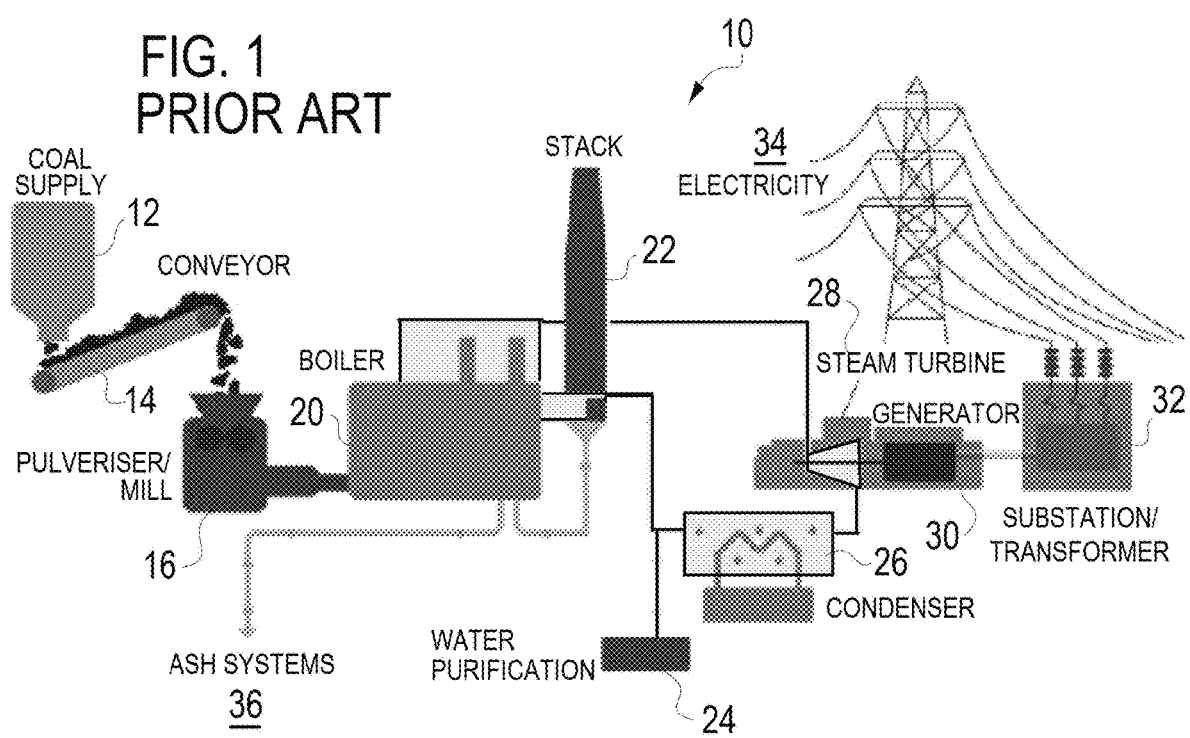
FIG. 1 is a schematic view of prior art conventional coal powered electrical generation.

The treated wet coal mix is fed to the mill 16 and the mill 16 operates in a conventional fashion. As noted above the treated wet coal mix may first go to bunkers 212 or stored in bunkers 212 after the mill 16. With the bunkers 212 after the mill 16, a second mixing unit may be added before the boiler, as part of the powder blowing unit. The powdered coal from the mill 16 and the SAP (with absorbed moisture) is, in due course, blown into the combustion chamber of a boiler 20 where it is burned at high temperature. The hot gases and heat energy produced converts water, contained within tubes lining the boiler 20, into steam in a conventional fashion. The present invention increases the BTU of the wet coal mix. The downstream elements of the system 10, from the boiler 20 and downstream, operate as discussed above in connection with FIG. 1.

The system 10 according to the present invention also contemplates the use of a moisture sensor 52 on the pulverized coal and SAP drying material (with absorbed water) downstream of the mill 16 prior to the boiler 20. Where bunkers 212 are used downstream of the mixer 12, the sensor 52 may be in the bunkers 212 or an outlet thereof. The sensor 52 can measure the moisture similar to the sensor 48. Sensor 52 provides a feedback sensor control system that can be used in place of the sensor 48, or preferably to supplement or cross check the results associated with the system 10 and sensor 48 on the conveyor 14 that is coupled to the controller 50. The sensor 52 may be implemented as a quality control feature done manually once per shift, or as often as desired, to verify the operation and adjust the associated control scheme for distributing or feeding the drying material.

Another aspect of the present invention relates to what is referenced as coal washing residual product. A background on coal processing before the plant 10 is helpful. Coal that comes from a mine is a complex mixture of materials with a large variety of physical properties. In addition to the coal itself, pieces of rock, sand, and various minerals are contained in the mixture. Thus, before coal is shipped to supply 12, it must be cleaned. The cleaning process consists of a number of steps that results in a coal product for supplies 12 that is specifically suited to the needs of PCC system 10. Among the earliest of these steps is crushing and sizing, two processes that reduce the coal to a form required by the consumer. The next step in coal preparation is a washing or cleaning step. Coal washing is accomplished by one of two major processes, by density separation or by froth flotation. Both processes depend on the fact that the particles of which a coal sample are made have different densities. When water, for example, is added to the sample, particles sink to various depths depending on their densities. The various components of the sample can thus be separated from each other. In some cases, a liquid other than water may be used to achieve this separation. In a heavy medium bath, for example, a mineral such as magnetite or feldspar in finely divided form may be mixed with water, forming a liquid medium whose density is significantly greater than that of pure water.

A number of devices and systems have been developed for extracting the various components of coal once they have been separated with a water or heavy medium treatment. One of the oldest of these devices is known as a jig. Another method of extraction, the cyclone, consists of a tank in which the working fluid (water or a heavy medium) is kept in a constant circular motion. The tank is constructed so that lighter clean coal particles are thrown out of one side, while heavier refuse particles are ejected through the bottom. Shaking tables are another extraction method. As the table shakes back and forth, particles are separated by size, producing clean coal at one end and waste products at the other. In cylindrical separators, a coal mixture is fed into a spinning column of air that throws the heavier waste particles outward. These heavier particles coat the inner wall of the cylinder and fall to the bottom, where they are drawn off. The clean coal particles remain in the center of the air column and are drawn off at the top of the cylinder. Froth flotation processes depend on the production of tiny air bubbles to which coal particles adhere. The amount of absorption onto a bubble depends not only on a particle's density, but also on certain surface characteristics. Separation of clean coal from waste materials can be achieved in froth flotation by varying factors, such as pH of the solution, time of treatment, particle size and shape, rate of aeration, solution density, and bubble size.

There is a desire to utilize and recover the coal dust or coal residual left behind in coal washing and a number of expensive systems have been proposed for this recovery. The present invention uses a similar process as used on the wet coal mix on the coal washing residual, after the non-coal material (sand, rock, etc.) has been largely removed. Specifically, the coal dust or coal washing residual is provided from a supply 112 and fed by a controllable distributing feeder 142 onto a conveyor 114 forming a stream of material to be treated that is to be directed to a pulverizing unit or mixing mill 116. The rate of coal wash residual product supplied by the feeder 142 and the speed of the conveyor 114 combine to define a mass flow rate of the coal wash residual product in the stream of material, typically measured in tons/hour. The feeder 42 may take many forms as discussed above with feeders 42 and 46, including gravity feeders, screw conveyors and any material transport device that allows the measured control of material.

The feeder 42 and the conveyor 114 may be coupled to a controller 150 which will calculate the coal wash residual product mass feed rate. Alternatively, the operational parameters of the feeder 42 and the belt 14 can be inputted into the controller 150 for the calculation of the coal wash residual product mass feed rate similar to the controller 50 discussed above.

A key component of this aspect of the method of the present invention is measuring the moisture content of the coal wash residual product to precisely know the moisture content. The present invention incorporates a sensor 148 that can measure the moisture of the coal wash residual product. The sensor 148 may be the same type as sensor 48 discussed above. As with sensor 48, it is possible the sensor 148 is a manually operated sensor that an operator periodically places into the coal wash residual product on the conveyor 114.

The present invention uses the measured moisture content of the coal wash residual product to control the distribution of a preferred drying agent, namely an SAP, from supply or hopper 144 through a feeder 146. The feeder 146, like feeders 142 and 42 and 46 above, may take many forms, including gravity feeders, screw conveyors and any material transport device that allows the precise measured control of drying material from the hopper 144. The drying material is added to the coal wash residual product to the pulverizing or processing or pub mill 116. A downstream moisture sensor 152, for feedback control, on the other side of the mill 116 may be used in place of, or preferably, together with sensor 148. Following processing the treated coal wash residual product can be transported via truck 154 or the like to form a separate supply 12' for the PCC plant 10.

As noted above, the precise amount of SAP drying material added to the coal wash residual product will depend upon the type of coal and the measured moisture content, but it is expected that 2.0-6.0 LBS of SAP drying material/ton of coal wash residual product will be added, more preferably 3.0 to 5.0 LBS of SAP drying material/ton of coal wash residual product. These amounts would correspond to a moisture content range of 25% to 40% of the coal wash residual product. Similar to the wet coal mix discussed above, in-between a high and low threshold (outside of which no SAP is used) there may be a step function to the control of the feeder 146, such as a low flow rate of SAP for a range of measured moistures, a medium for a higher range of measured moisture and a high range for the highest range of measured moistures of the coal wash residual product. The treated coal wash product allows the coal residual to be effectively used and it is anticipated that this coal residual treatment process could be used independently without the remaining aspect of the invention (i.e., without the SAP added to the wet coal mix).

The above description is representative of the present invention but not restrictive thereof. Broadly summarized the present invention teaches a method of wet coal processing for electrical power generation that comprises the providing a stream of a wet coal mix for an electrical power generation system having a boiler, such as metering coal product onto a conveyor; measuring the amount of moisture of the wet coal mix in the stream, such as with a moisture sensor on the conveyor; determining an amount of drying material to be added to the wet coal mix; adding the determined amount of drying material, such as one or more super absorbent polymers, added to the wet coal mix; Milling the treated wet coal mix; Transporting the milled treated wet coal mix to the boiler of the electrical power generation system for combustion. The method may utilize treated coal wash residual product and teaches a process for treating coal wash residual product The full scope of the present invention are set forth in the appended claims and equivalents thereto.

What is claimed is:

1. A method of wet coal processing for electrical power generation comprising the steps of:
   Providing a stream of a wet coal mix for an electrical power generation system having a boiler, wherein the wet coal mix has an amount of moisture and may be formed of distinct types of coal;
   Measuring the amount of moisture of the wet coal mix in the stream of wet coal mix;
   Determining an amount of drying material to be added to the wet coal mix in the stream of wet coal mix, based upon the measured amount of moisture of the wet coal mix in the stream of wet coal mix and the type of coal forming the wet coal mix;
   Adding the determined amount of drying material added to the wet coal mix in the stream of wet coal mix, which amount of drying material is based upon the measured amount of moisture of the wet coal mix in the stream of wet coal mix;
   Milling the combination of drying material added to the wet coal mix and the wet coal mix; and
   Transporting the milled combination of drying material added to the wet coal mix and the wet coal mix to the boiler of the electrical power generation system for combustion.

2. The method according to claim 1, wherein the drying material is one or a combination of Superabsorbent polymers.

3. The method according to claim 2, wherein the drying material is sodium poly-acrylate.

4. The method according to claim 2, wherein the step of providing a stream of a wet coal mix includes metering coal onto a conveyor.

5. The method according to claim 4, wherein the step of measuring the amount of moisture of the wet coal mix in the stream of wet coal mix includes the use of a moisture sensor on the conveyor.

6. The method according to claim 5, wherein the moisture sensor on the conveyor is coupled to a controller.

7. The method according to claim 4, wherein the step of measuring the amount of moisture of the wet coal mix in the stream of wet coal mix includes a feedback measurement of moisture using a moisture sensor measuring moisture after the addition of the determined amount of drying material.

8. The method according to claim 4, wherein the step of adding the determined amount of drying material added to the wet coal mix in the stream of wet coal mix adds 0.3-2.0 LBS of SAP drying material/ton of wet coal mix.

9. The method according to claim 4, wherein the step of adding the determined amount of drying material added to the wet coal mix in the stream of wet coal mix adds 0.5 to 1.5 LBS of SAP drying material/ton of wet coal mix.

10. The method according to claim 4, wherein the process operates between a low and high moisture measurement cut-off.

11. The method according to claim 4, wherein the step of adding the determined amount of drying material added to the wet coal mix in the stream of wet coal mix in-between the high and low threshold includes a step function to control of the amount of drying agent added.

12. The method according to claim 4, wherein the step of providing a stream of a wet coal mix coal include inclusion of a treated coal wash residual product treated by the prior addition of one or more super absorbent polymers.

* * * * *